United States Patent
Wang et al.

(10) Patent No.: US 10,477,453 B2
(45) Date of Patent: Nov. 12, 2019

(54) PATH SELECTION METHOD, DEVICE, AND SYSTEM

(71) Applicant: Huawei Technologies Co., Ltd., Shenzhen, Guangdong (CN)

(72) Inventors: Da Wang, Beijing (CN); Jian Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 69 days.

(21) Appl. No.: 15/570,583

(22) PCT Filed: Apr. 30, 2015

(86) PCT No.: PCT/CN2015/078142
§ 371 (c)(1),
(2) Date: Oct. 30, 2017

(87) PCT Pub. No.: WO2016/172983
PCT Pub. Date: Nov. 3, 2016

(65) Prior Publication Data
US 2018/0132162 A1    May 10, 2018

(51) Int. Cl.
*H04W 40/36* (2009.01)
*H04W 88/02* (2009.01)
(Continued)

(52) U.S. Cl.
CPC ........... *H04W 40/36* (2013.01); *H04W 8/005* (2013.01); *H04W 36/30* (2013.01); *H04W 40/02* (2013.01);
(Continued)

(58) Field of Classification Search
CPC .................................................. H04W 40/36
(Continued)

(56) References Cited

U.S. PATENT DOCUMENTS

2004/0022224 A1   2/2004   Billhartz
2004/0215822 A1   10/2004  Abe et al.
(Continued)

FOREIGN PATENT DOCUMENTS

CN         1679359 A    10/2005
CN       101286930 A    10/2008
(Continued)

OTHER PUBLICATIONS

Catt, "Consideration about the Communication via the ProSe UE-UE Relay," S2-143881 (revision of S2-14xxxx), SA WG2 Meeting #106, San Francisco, California, USA, Nov. 17-21, 2014, 5 pages.
(Continued)

*Primary Examiner* — Shripal K Khajuria
(74) *Attorney, Agent, or Firm* — Kilpatrick Townsend & Stockton, LLP

(57) ABSTRACT

The present invention relates to the communications field, and discloses a path selection method, a device, and a system, to resolve a problem in the prior art that if a distance between two terminal devices performing direct communication is relatively long or channel quality changes relatively greatly, the two terminal devices cannot perform D2D communication. A specific solution is: A first device receives first discovery information sent by a second device, adds an ID of the first device to the first discovery information, and sends the first discovery information to which the ID of the first device is added, so that a destination device can determine a transmission path after receiving the first discovery information. The present invention is used for path selection.

14 Claims, 5 Drawing Sheets

(51) Int. Cl.
*H04W 88/04* (2009.01)
*H04W 76/12* (2018.01)
*H04W 76/14* (2018.01)
*H04W 8/00* (2009.01)
*H04W 36/30* (2009.01)
*H04W 40/12* (2009.01)
*H04W 40/02* (2009.01)
*H04W 40/24* (2009.01)

(52) U.S. Cl.
CPC ........... *H04W 40/12* (2013.01); *H04W 40/24* (2013.01); *H04W 76/12* (2018.02); *H04W 76/14* (2018.02); *H04W 88/02* (2013.01); *H04W 88/04* (2013.01)

(58) Field of Classification Search
USPC ........................................................ 370/331
See application file for complete search history.

(56) References Cited

U.S. PATENT DOCUMENTS

| | | | | |
|---|---|---|---|---|
| 2005/0122955 A1* | 6/2005 | Lin | ......................... | H04L 45/04 370/351 |
| 2007/0274295 A1* | 11/2007 | Nishimura | .............. | H04L 45/02 370/352 |
| 2014/0211705 A1 | 7/2014 | Baek | | |
| 2015/0029866 A1 | 1/2015 | Liao et al. | | |
| 2015/0079906 A1 | 3/2015 | Koo et al. | | |
| 2016/0150390 A1 | 5/2016 | Chen et al. | | |
| 2016/0255668 A1 | 9/2016 | Wei | | |

FOREIGN PATENT DOCUMENTS

| | | |
|---|---|---|
| CN | 101662811 A | 3/2010 |
| CN | 101877900 A | 11/2010 |
| CN | 104581613 A | 4/2015 |
| EP | 2983426 A1 | 2/2016 |
| JP | 2003-249936 A | 9/2003 |
| JP | 2004-282255 A | 10/2004 |
| WO | 2014113537 A1 | 7/2014 |
| WO | 2014161383 A1 | 10/2014 |
| WO | 2015020460 A1 | 2/2015 |

OTHER PUBLICATIONS

R1-134308 ZTE,"Resource Allocation of D2D communication",3GPP TSG-RAN WG1 Meeting #74bis,Guangzhou, China, 7th — 11rd Oct. 2013,total 6 pages.

* cited by examiner

PATH SELECTION METHOD, DEVICE, AND SYSTEM

CROSS-REFERENCE TO RELATED APPLICATIONS

This application is a national stage of International Application No. PCT/CN2015/078142, filed on Apr. 30, 2015, which is hereby incorporated by reference in its entirety.

TECHNICAL FIELD

The present invention relates to the communications field, and in particular, to a path selection method, a device, and a system.

BACKGROUND

With development of communications technologies, more data is transmitted in a wireless communications system. To meet user requirements, higher transmission efficiency and a higher throughput are needed. Therefore, how to improve resource utilization and data transmission efficiency of limited time-frequency resources becomes a key problem. Cell resources are reused in a D2D ProSe (Device to Device Proximity Service, device to device proximity service). Therefore, terminal devices can perform direct communication, thereby improving resource utilization and network capacity.

In the prior art, for example, in a D2D scenario of an LTE (Long Term Evolution, Long Term Evolution) system, terminal devices such as mobile phones and tablet computers perform direct communication in a D2D system. Therefore, the devices have relatively great mobility, and channel states change relatively quickly. If a distance between the two terminal devices performing direct communication is relatively long or channel quality changes relatively greatly, the two terminal devices cannot perform. D2D communication,

SUMMARY

Embodiments of the present invention provide a path selection method, a device, and a system, to resolve a problem in the prior art that if a distance between two terminal devices performing direct communication is relatively long or channel quality changes relatively greatly, the two terminal devices cannot perform D2D communication.

To achieve the foregoing objective, the following technical solutions are used in the embodiments of the present invention:

According to a first aspect, an embodiment of the present invention provides a first device, including: a processor, a memory, a bus, a transmitter, and a receiver, where the processor, the memory, the transmitter, and the receiver are connected to each other by using the bus;

the receiver is configured to receive first discovery information sent by a second device, where the first discovery information includes an identifier ID of the second device, or the first discovery information includes the ID of the second device and an ID of a third device;

the processor is configured to add an ID of the first device to the first discovery information received by the receiver; and the transmitter is configured to send the first discovery information to which the ID of the first device is added by the processor.

With reference to the first aspect, in a first possible implementation of the first aspect, the receiver is further configured to receive first path information, where the first path information is used to indicate a data transmission path between the second device and the third device, the first path information includes the ID of the first device and the ID of the second device, or the first path information includes the ID of the first device, the ID of the second device, and the ID of the third device; and the processor is further configured to store the first path information received by the receiver.

With reference to the first possible implementation of the first aspect, in a second possible implementation of the first aspect, the first path information is sent to the first device by a base station, or is sent to the first device by a preceding-hop device that is of the first device and that is indicated by the first path information; and the transmitter is further configured to: when the first path information is sent to the first device by the preceding-hop device that is of the first device and that is indicated by the first path information, send, according to the first path information, the first path information to a next-hop device that is of the first device and that is indicated by the first path information.

With reference to the first possible implementation of the first aspect or the second possible implementation of the first aspect, in a third possible implementation of the first aspect, the first path information includes duration information of the first path information, and the duration information of the first path information is used to indicate validity duration of the first path information; and the processor is further configured to delete the first path information when duration in which the first path information is stored exceeds the validity duration indicated by the duration information.

With reference to the first possible implementation of the first aspect or the second possible implementation of the first aspect, in a fourth possible implementation of the first aspect, the receiver is further configured to receive a deletion instruction, where the deletion instruction is used to instruct to delete the first path information; and the processor is further configured to delete the first path information according to the deletion instruction received by the receiver.

With reference to any one of the first possible implementation of the first aspect to the fourth possible implementation of the first aspect, in a fifth possible implementation of the first aspect, the receiver is further configured to receive data and indication information of the data, where the indication information of the data includes an ID of a source device and an ID of a destination device, or the indication information of the data includes only the ID of the source device, and the source device is the third device and the destination device is the second device, or the source device is the second device and the destination device is the third device;

the processor is further configured to determine a transmission path of the data according to the indication information of the data and the first path information received by the receiver; and the transmitter is further configured to transmit the data and the indication information of the data according to the transmission path of the data that is determined by the processor.

With reference to the fifth possible implementation of the first aspect, in a sixth possible implementation of the first aspect, the processor is further configured to add an ID of the next-hop device of the first device to the indication information of the data according to the transmission path of the data.

With reference to the fifth possible implementation of the first aspect, in a seventh possible implementation of the first aspect, the processor is further configured to: generate a first scrambling code sequence according to a first scrambling code seed, and scramble at least one of the data or the indication information of the data according to the first scrambling code sequence, where the first scrambling code seed is generated according to the ID of the next-hop device that is of the first device and that is in the transmission path of the data.

With reference to the fifth possible implementation of the first aspect, in an eighth possible implementation of the first aspect, the processor is further configured to: when the indication information of the data further includes a path information identifier, decode the data and store path information included in the data, where the path information identifier is used to indicate that the data includes the path information.

With reference to any one of the first aspect to the eighth possible implementation of the first aspect, in a ninth possible implementation of the first aspect, the processor is further configured to add signal quality information of the first device to the first discovery information, where the signal quality information of the first device is used to indicate signal quality that exists when the first device receives the first discovery information.

With reference to the ninth possible implementation of the first aspect, in a tenth possible implementation of the first aspect, the signal quality information of the first device includes at least one of signal strength information that exists when the first device receives the first discovery information, signal-to-noise ratio information that exists when the first device receives the first discovery information, or modulation and coding scheme MCS information that exists when the first device receives the first discovery information.

With reference to any one of the first aspect to the tenth possible implementation of the first aspect, in an eleventh possible implementation of the first aspect, the processor is further configured to add the ID of the first device to the first discovery information when the first discovery information does not include the ID of the first device.

With reference to any one of the first aspect to the eleventh possible implementation of the first aspect, in a twelfth possible implementation of the first aspect, the first discovery information includes duration information of the first discovery information, and the duration information of the first discovery information is used to indicate validity duration of the first discovery information; and the processor is further configured to add the ID of the first device to the first discovery information when a time point at which the first device receives the first discovery information is within the validity duration of the first discovery information.

With reference to any one of the first aspect to the twelfth possible implementation of the first aspect, in a thirteenth possible implementation of the first aspect, the ID of the first device is assigned by the base station or configured by the first device; and the ID of the first device includes at least one of a proximity service ProSe ID of the first device or a cell radio network temporary identifier C-RNTI of the first device.

According to a second aspect, an embodiment of the present invention provides a third device, including: a processor, a memory, a bus, a transmitter, and a receiver, where the processor, the memory, the transmitter, and the receiver are connected to each other by using the bus;

the receiver is configured to receive M pieces of discovery information, where an $m^{th}$ discovery information of the M pieces of discovery information includes an ID of the third device, an ID of a second device, and IDs of $N_m$ relay devices, or the $m^{th}$ discovery information of the M pieces of discovery information includes the ID of the second device and the IDs of the $N_m$ relay devices, where M and $N_m$ are positive integers, and m is an integer within [1, M];

the processor is configured to: determine one piece of discovery information of the M pieces of discovery information received by the receiver as first discovery information, and generate first path information according to the first discovery information, where the first path information includes an ID of a relay device, the ID of the third device, and the ID of the second device in the first discovery information, or the first path information includes the IDs of the relay devices and the ID of the second device in the first discovery information; and the transmitter is configured to send the first path information generated by the processor.

With reference to the second aspect, in a first possible implementation of the second aspect, the processor is further configured to use discovery information that is of the M pieces of discovery information and that includes a minimum quantity of relay devices as the first discovery information.

With reference to the second aspect, in a second possible implementation of the second aspect, the $m^{th}$ discovery information of the M pieces of discovery information further includes signal quality information of each of the $N_m$ relay devices, where signal quality information of an $i^{th}$ relay device of the $N_m$ relay devices is used to indicate signal quality when the $i^{th}$ relay device receives the first discovery information, and i is an integer within [1, $N_m$]; and the processor is further configured to use discovery information that includes best signal quality of a relay device as the first discovery information.

With reference to the second possible implementation of the second aspect, in a third possible implementation of the second aspect, the signal quality information of the $i^{th}$ relay device includes at least one of signal strength information that exists when the $i^{th}$ relay device receives the first discovery information, signal-to-noise ratio information that exists when the $i^{th}$ relay device receives the first discovery information, or modulation and coding scheme MCS information that exists when the $i^{th}$ relay device receives the first discovery information.

With reference to any one of the second aspect to the third possible implementation of the second aspect, in a fourth possible implementation of the second aspect, the transmitter is further configured to send the first path information to a base station, or to a next-hop device that is of the third device and that is indicated by the first path information.

With reference to any one of the second aspect to the fourth possible implementation of the second aspect, in a fifth possible implementation of the second aspect, the first path information includes duration information of the first path information, where the duration information of the first path information is used to indicate validity duration of the first path information.

With reference to any one of the second aspect to the fifth possible implementation of the second aspect, in a sixth possible implementation of the second aspect, the ID of the third device is assigned by the base station or configured by the third device; and the ID of the third device includes at least one of a proximity service ProSe ID of the third device or a cell radio network temporary identifier C-RNTI of the third device.

According to a third aspect, an embodiment of the present invention provides a first device, including:

a receiving unit, configured to receive first discovery information sent by a second device, where the first discovery information includes an identifier ID of the second device, or the first discovery information includes the ID of the second device and an ID of a third device;

a path discovery unit, configured to add an ID of the first device to the first discovery information received by the receiving unit; and a sending unit, configured to send the first discovery information to which the ID of the first device is added by the path discovery unit.

With reference to the third aspect, in a first possible implementation of the third aspect, the receiving unit is further configured to receive first path information, where the first path information is used to indicate a data transmission path between the second device and the third device, the first path information includes the ID of the first device and the ID of the second device, or the first path information includes the ID of the first device, the ID of the second device, and the ID of the third device; and the first device further includes a path selection unit, configured to store the first path information received by the receiving unit.

With reference to the first possible implementation of the third aspect, in a second possible implementation of the third aspect, the first path information is sent to the first device by a base station, or is sent to the first device by a preceding-hop device that is of the first device and that is indicated by the first path information; and the sending unit is further configured to: when the first path information is sent to the first device by the preceding-hop device that is of the first device and that is indicated by the first path information, send, according to the first path information, the first path information to a next-hop device that is of the first device and that is indicated by the first path information.

With reference to the first possible implementation of the third aspect or the second possible implementation of the third aspect, in a third possible implementation of the third aspect, the first path information includes duration information of the first path information, and the duration information of the first path information is used to indicate validity duration of the first path information; and the path selection unit is further configured to delete the first path information when duration in which the first path information is stored exceeds the validity duration indicated by the duration information.

With reference to the first possible implementation of the third aspect or the second possible implementation of the third aspect, in a fourth possible implementation of the third aspect, the receiving unit is further configured to receive a deletion instruction, where the deletion instruction is used to instruct to delete the first path information; and the path selection unit is further configured to delete the first path information according to the deletion instruction received by the receiving unit.

With reference to any one of the first possible implementation of the third aspect to the fourth possible implementation of the third aspect, in a fifth possible implementation of the third aspect, the receiving unit is further configured to receive data and indication information of the data, where the indication information of the data includes an ID of a source device and an ID of a destination device, or the indication information of the data includes only the ID of the source device, and the source device is the third device and the destination device is the second device, or the source device is the second device and the destination device is the third device;

the path selection unit is further configured to determine a transmission path of the data according to the indication information of the data and the first path information received by the receiving unit; and the sending unit is further configured to transmit the data and the indication information of the data according to the transmission path of the data that is determined by the path selection unit.

With reference to the fifth possible implementation of the third aspect, in a sixth possible implementation of the third aspect, the path selection unit is further configured to add an ID of the next-hop device of the first device to the indication information of the data according to the transmission path of the data.

With reference to the fifth possible implementation of the third aspect, in a seventh possible implementation of the third aspect, the first device further includes a scrambling unit, configured to: generate a first scrambling code sequence according to a first scrambling code seed, and scramble at least one of the data or the indication information of the data according to the first scrambling code sequence, where the first scrambling code seed is generated according to the ID of the next-hop device that is of the first device and that is in the transmission path of the data.

With reference to the fifth possible implementation of the third aspect, in an eighth possible implementation of the third aspect, the path selection unit is further configured to: when the indication information of the data further includes a path information identifier, decode the data and store path information included in the data, where the path information identifier is used to indicate that the data includes the path information.

With reference to any one of the third aspect to the eighth possible implementation of the third aspect, in a ninth possible implementation of the third aspect, the path discovery unit is further configured to add signal quality information of the first device to the first discovery information, where the signal quality information of the first device is used to indicate signal quality that exists when the first device receives the first discovery information.

With reference to the ninth possible implementation of the third aspect, in a tenth possible implementation of the third aspect, the signal quality information of the first device includes at least one of signal strength information that exists when the first device receives the first discovery information, signal-to-noise ratio information that exists when the first device receives the first discovery information, or modulation and coding scheme MCS information that exists when the first device receives the first discovery information.

With reference to any one of the third aspect to the tenth possible implementation of the third aspect, in an eleventh possible implementation of the third aspect, the path discovery unit is further configured to add the ID of the first device to the first discovery information when the first discovery information does not include the ID of the first device.

With reference to any one of the third aspect to the eleventh possible implementation of the third aspect, in a twelfth possible implementation of the third aspect, the first discovery information includes duration information of the first discovery information, and the duration information of the first discovery information is used to indicate validity duration of the first discovery information; and the path discovery unit is further configured to add the ID of the first device to the first discovery information when a time point at which the first device receives the first discovery information is within the validity duration of the first discovery information.

With reference to any one of the third aspect to the twelfth possible implementation of the third aspect, in a thirteenth possible implementation of the third aspect, the ID of the first device is assigned by the base station or configured by the first device; and the ID of the first device includes at least one of a proximity service ProSe ID of the first device or a cell radio network temporary identifier C-RNTI of the first device.

According to a fourth aspect, an embodiment of the present invention provides a third device, including:

a receiving unit, configured to receive M pieces of discovery information, where an $m^{th}$ discovery information of the M pieces of discovery information includes an ID of the third device, an ID of a second device, and IDs of $N_m$ relay devices, or the $m^{th}$ discovery information of the M pieces of discovery information includes the ID of the second device and the IDs of the $N_m$ relay devices, where M and $N_m$ are positive integers, and m is an integer within [1, M];

a path selection unit, configured to: determine one piece of discovery information of the M pieces of discovery information received by the receiving unit as the first discovery information, and generate first path information according to the first discovery information, where the first path information includes an ID of a relay device, the ID of the third device, and the ID of the second device in the first discovery information, or the first path information includes the IDs of the relay devices and the ID of the second device in the first discovery information; and a sending unit, configured to send the first path information generated by the path selection unit.

With reference to the fourth aspect, in a first possible implementation of the fourth aspect, the path selection unit is further configured to use discovery information that is of the M pieces of discovery information and that includes a minimum quantity of relay devices as the first discovery information.

With reference to the fourth aspect, in a second possible implementation of the fourth aspect, the $m^{th}$ discovery information of the M pieces of discovery information further includes signal quality information of each of the $N_m$ relay devices, where signal quality information of an $i^{th}$ relay device of the $N_m$ relay devices is used to indicate signal quality when the $i^{th}$ relay device receives the first discovery information, and i is an integer within [1, $N_m$]; and the path selection unit is further configured to use discovery information that includes best signal quality of a relay device as the first discovery information.

With reference to the second possible implementation of the fourth aspect, in a third possible implementation of the fourth aspect, the signal quality information of the $i^{th}$ relay device includes at least one of signal strength information that exists when the $i^{th}$ relay device receives the first discovery information, signal-to-noise ratio information that exists when the $i^{th}$ relay device receives the first discovery information, or modulation and coding scheme MCS information that exists when the $i^{th}$ relay device receives the first discovery information.

With reference to any one of the fourth aspect to the third possible implementation of the fourth aspect, in a fourth possible implementation of the fourth aspect, the sending unit is further configured to send the first path information to a base station, or to a next-hop device that is of the third device and that is indicated by the first path information.

With reference to any one of the fourth aspect to the fourth possible implementation of the fourth aspect, in a fifth possible implementation of the fourth aspect, the first path information includes duration information of the first path information, where the duration information of the first path information is used to indicate validity duration of the first path information.

With reference to any one of the fourth aspect to the fifth possible implementation of the fourth aspect, in a sixth possible implementation of the fourth aspect, the ID of the third device is assigned by the base station or configured by the third device; and the ID of the third device includes at least one of a proximity service ProSe ID of the third device or a cell radio network temporary identifier C-RNTI of the third device.

According to a fifth aspect, an embodiment of the present invention provides a path selection method, including:

receiving, by a first device, first discovery information sent by a second device, where the first discovery information includes an identifier ID of the second device, or the first discovery information includes the ID of the second device and an ID of a third device; and adding, by the first device, an ID of the first device to the first discovery information and sending the first discovery information to which the ID of the first device is added.

With reference to the fifth aspect, in a first possible implementation of the fifth aspect, after the adding, by the first device, an ID of the first device to the first discovery information, the method further includes:

receiving and storing, by the first device, first path information, where the first path information is used to indicate a data transmission path between the second device and the third device, the first path information includes the ID of the first device and the ID of the second device, or the first path information includes the ID of the first device, the ID of the second device, and the ID of the third device.

With reference to the first possible implementation of the fifth aspect, in a second possible implementation of the fifth aspect, the first path information is sent to the first device by a base station, or is sent to the first device by a preceding-hop device that is of the first device and that is indicated by the first path information; and when the first path information is sent to the first device by the preceding-hop device that is of the first device and that is indicated by the first path information, after the receiving, by the first device, first path information, the method further includes:

sending, by the first device, according to the first path information, the first path information to a next-hop device that is of the first device and that is indicated by the first path information.

With reference to the first possible implementation of the fifth aspect or the second possible implementation of the fifth aspect, in a third possible implementation of the fifth aspect, the first path information includes duration information of the first path information, and the duration information of the first path information is used to indicate validity duration of the first path information; and when duration in which the first device stores the first path information exceeds the validity duration indicated by the duration information, the method further includes:

deleting, by the first device, the first path information.

With reference to the first possible implementation of the fifth aspect or the second possible implementation of the fifth aspect, in a fourth possible implementation of the fifth aspect, the method further includes:

receiving, by the first device, a deletion instruction, where the deletion instruction is used to instruct to delete the first path information; and deleting, by the first device, the first path information according to the deletion instruction.

With reference to any one of the first possible implementation of the fifth aspect to the fourth possible implementation of the fifth aspect, in a fifth possible implementation of the fifth aspect, after the receiving, by the first device, first path information, the method further includes:

receiving, by the first device, data and indication information of the data, where the indication information of the data includes an ID of a source device and an ID of a destination device, or the indication information of the data includes only the ID of the source device, and the source device is the third device and the destination device is the second device, or the source device is the second device and the destination device is the third device;

determining, by the first device, a transmission path of the data according to the indication information of the data and the first path information; and transmitting, by the first device, the data and the indication information of the data according to the transmission path of the data.

With reference to the fifth possible implementation of the fifth aspect, in a sixth possible implementation of the fifth aspect, after the determining, by the first device, a transmission path of the data according to the indication information of the data and the first path information, the method further includes:

adding, by the first device, an ID of the next-hop device of the first device to the indication information of the data according to the transmission path of the data.

With reference to the fifth possible implementation of the fifth aspect, in a seventh possible implementation of the fifth aspect, after the determining, by the first device, a transmission path of the data according to the indication information of the data and the first path information, the method further includes:

generating, by the first device, a first scrambling code sequence according to a first scrambling code seed, where the first scrambling code seed is generated according to the ID of the next-hop device that is of the first device and that is in the transmission path of the data; and scrambling, by the first device, at least one of the data or the indication information of the data according to the first scrambling code sequence.

With reference to the fifth possible implementation of the fifth aspect, in an eighth possible implementation of the fifth aspect, the method further includes:

if the indication information of the data further includes a path information identifier, decoding, by the first device, the data, and storing path information included in the data, where the path information identifier is used to indicate that the data includes the path information.

With reference to any one of the fifth aspect to the eighth possible implementation of the fifth aspect, in a ninth possible implementation of the fifth aspect, the adding, by the first device, an ID of the first device to the first discovery information includes:

adding, by the first device, signal quality information of the first device to the first discovery information, where the signal quality information of the first device is used to indicate signal quality that exists when the first device receives the first discovery information.

With reference to the ninth possible implementation of the fifth aspect, in a tenth possible implementation of the fifth aspect, the signal quality information of the first device includes at least one of signal strength information that exists when the first device receives the first discovery information, signal-to-noise ratio information that exists when the first device receives the first discovery information, or modulation and coding scheme MCS information that exists when the first device receives the first discovery information.

With reference to any one of the fifth aspect to the tenth possible implementation of the fifth aspect, in an eleventh possible implementation of the fifth aspect, the adding, by the first device, an ID of the first device to the first discovery information includes:

when the first discovery information does not include the ID of the first device, adding, by the first device, the ID of the first device to the first discovery information.

With reference to any one of the fifth aspect to the eleventh possible implementation of the fifth aspect, in a twelfth possible implementation of the fifth aspect, the first discovery information includes duration information of the first discovery information, and the duration information of the first discovery information is used to indicate validity duration of the first discovery information; and the adding, by the first device, an ID of the first device to the first discovery information includes:

when a time point at which the first device receives the first discovery information is within the validity duration of the first discovery information, adding, by the first device, the ID of the first device to the first discovery information.

With reference to any one of the fifth aspect to the twelfth possible implementation of the fifth aspect, in a thirteenth possible implementation of the fifth aspect, the ID of the first device is assigned by the base station or configured by the first device; and the ID of the first device includes at least one of a proximity service ProSe ID of the first device or a cell radio network temporary identifier C-RNTI of the first device.

According to a sixth aspect, an embodiment of the present invention provides a path selection method, including:

receiving, by a third device, M pieces of discovery information, where an $m^{th}$ discovery information of the M pieces of discovery information includes an ID of the third device, an ID of a second device, and IDs of $N_m$ relay devices, or the $m^{th}$ discovery information of the M pieces of discovery information includes the ID of the second device and the IDs of the $N_m$ relay devices, where M and $N_m$ are positive integers, and m is an integer within [1, M];

determining, by the third device, one piece of discovery information of the M pieces of discovery information as first discovery information, and generating first path information according to the first discovery information, where the first path information includes an ID of a relay device, the ID of the third device, and the ID of the second device in the first discovery information, or the first path information includes the IDs of the relay devices and the ID of the second device in the first discovery information; and sending, by the third device, the first path information.

With reference to the sixth aspect, in a first possible implementation of the sixth aspect, the determining, by the third device, one piece of discovery information of the M pieces of discovery information as first discovery information includes:

using, by the third device, discovery information that is of the M pieces of discovery information and that includes a minimum quantity of relay devices as the first discovery information.

With reference to the sixth aspect, in a second possible implementation of the sixth aspect, the $m^{th}$ discovery information of the M pieces of discovery information further includes signal quality information of each of the $N_m$ relay devices, where signal quality information of an $i^{th}$ relay device of the $N_m$ relay devices is used to indicate signal quality when the $i^{th}$ relay device receives the first discovery information, and i is an integer within [1, $N_m$]; and the determining, by the third device, one piece of discovery information of the M pieces of discovery information as first discovery information includes:

using, by the third device, discovery information that includes best, signal quality of a relay device as the first discovery information.

With reference to the second, possible implementation of the sixth aspect, in a third possible implementation of the sixth aspect, the signal quality information of the $i^{th}$ relay device includes at least, one of signal strength information that exists when the $i^{th}$ relay device receives the first discovery information, signal-to-noise ratio information that exists when the $i^{th}$ relay device receives the first discovery information, or modulation and coding scheme MCS information that exists when, the $i^{th}$ relay device receives the first discovery information.

With reference to any one of the sixth aspect to the third possible implementation of the sixth, aspect, in a fourth, possible implementation of the sixth aspect, the sending, by the third device, the first path information includes:

sending, by the third device, the first path information to a base station or a next-hop device that is of the third device and that is indicated by the first path information.

With reference to any one of the sixth aspect to the fourth possible implementation of the sixth aspect, in a fifth possible implementation of the sixth aspect, the first path information includes duration information of the first path information, where the duration information of the first path information is used to indicate validity duration of the first path information.

With reference to any one of the sixth aspect to the fifth possible implementation of the sixth aspect, in a sixth possible implementation of the sixth aspect, the ID of the third device is assigned by the base station or configured by the third device; and the ID of the third device includes at least one of a proximity service ProSe ID of the third device or a cell radio network temporary identifier C-RNTI of the third device.

According to a seventh aspect, an embodiment of the present invention provides a wireless network system, including a first device, a second device, and a third device, where the first device is the first device according to any one of the first aspect or the possible implementations of the first aspect, and the third device is the third device according to any one of the second aspect or the possible implementations of the second aspect; or the first device is the first device according to any one of the third aspect or the possible implementations of the third aspect, and the third device is the third device according to any one of the fourth aspect or the possible implementations of the fourth aspect.

Embodiments of the present invention provide a path selection method, a device, and a system. A first device receives first discovery information sent by a second device, adds an ID of the first device to the first discovery information, and sends the first discovery information to which the ID of the first device is added, so that a destination device can determine a transmission path after receiving the first discovery information. In this way, a problem in the prior art that if a distance between two terminal devices performing direct communication is relatively long or channel quality changes relatively greatly, the two terminal devices cannot, perform D2D communication is resolved.

BRIEF DESCRIPTION OF DRAWINGS

To describe the technical solutions in the embodiments of the present invention or in the prior art more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

It should be understood that, the technical solutions of the embodiments of the present invention may be applied to various communications systems, such as: a Global System for Mobile Communications (Global System of Mobile communication, GSM) system, a Code Division Multiple Access (Code Division Multiple Access, CDMA) system, a Wideband Code Division Multiple Access (Wideband Code Division Multiple Access, WCDMA) system, a general packet radio service (General Packet Radio Service, GPRS), a Long Term Evolution (Long Term Evolution, LTE) system, an LTE frequency division duplex (Frequency Division Duplex, FDD) system, an LTE time division duplex (Time Division Duplex, TDD), a Universal Mobile Telecommunications System (Universal Mobile Telecommunication System, UMTS), and a Worldwide Interoperability for Microwave Access (Worldwide Interoperability for Microwave Access, WiMAX) communications system.

It should be understood that in the embodiments of the present invention, preferably, a first device, a second device, or a third device is user equipment (English full name: User Equipment, UE for short). The user equipment may be a mobile phone (or referred to as a "cellular" phone), or a computer having a wireless communication function. Alternatively, the user equipment may be a portable, pocket-sized, handheld, computer built-in, or in-vehicle mobile apparatus.

It should be understood that the "first", "second" and "third" in the embodiments of the present invention are merely for distinguishing, and not for limiting the embodiments of the present invention.

Figure 1:
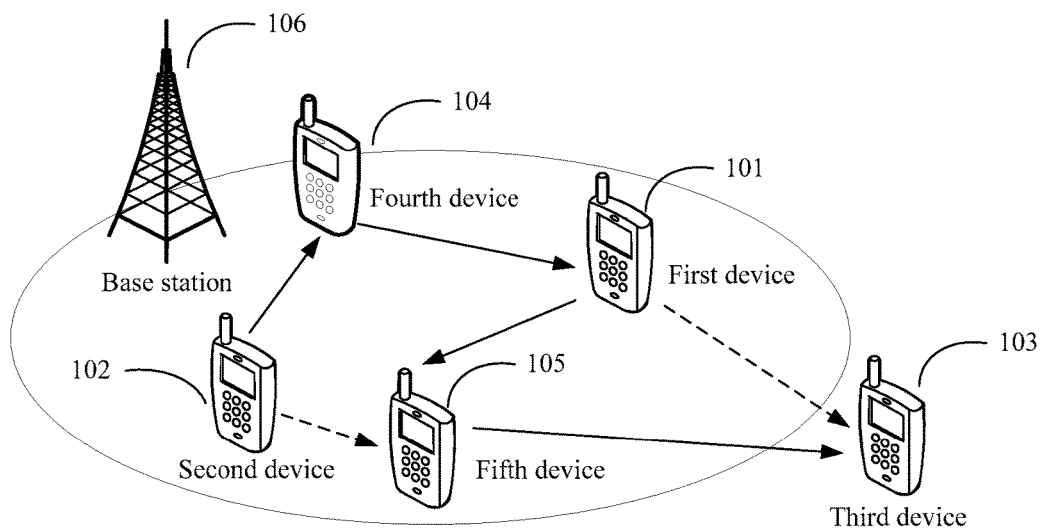
FIG. 1 is a schematic structural diagram of a wireless network system according to an embodiment of the present invention.

As shown in FIG. 1, an embodiment of the present invention provides a wireless network system 10. The wireless network system 10 includes: a first device 101, a second device 102, a third device 103, a fourth device 104, a fifth device 105, and a base station 106. The wireless network system 10 is preferably applied to a D2D (Device to Device, device to device) scenario. The first device 101, the second device 102, the third device 103, the fourth device 104, and the fifth device 105 are all user equipments. Optionally, during information transmission, the first device 101, the fourth device 104, and the fifth device 105 may be relay devices and may perform a same method, for example, a path selection method and an information transmission method described in embodiments that correspond to FIG. 2 and FIG. 3. The second device 102 may be a source device for information transmission, and the third device 103 may be a destination device for information transmission. Certainly, the third device 103 may transmit information to the second device 102 by using the first device 101. The description is provided herein by way of example only. The first device 101, the second device 102, the third device 103, the fourth device 104, and the fifth device 105 may have same functions, and the five devices may all be used as destination devices, relay devices, or source devices. Certainly, the wireless network system may include more user equipments and other equipments. This is not limited in the present invention.

Figure 2:
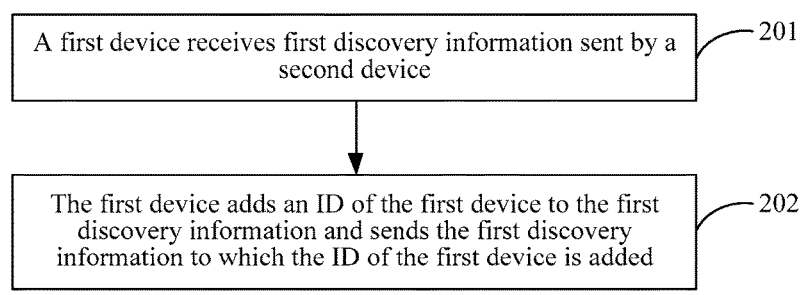
FIG. 2 is a schematic flowchart of a path selection method according to an embodiment of the present invention.

An embodiment of the present invention provides a path selection method, which is preferably applied to a D2D scenario. The path selection method provided in this embodiment of the present invention may be implemented based on the wireless network system shown in FIG. 1. Certainly, the description is provided herein by way of example only, and does not indicate that the present invention is limited thereto. Referring to FIG. 2, the method includes the following steps.

201. A first device receives first discovery information sent, by a second device.

The first discovery information includes an identifier ID of the second device. Alternatively, the first discovery information includes the ID of the second device and an ID of a third device. Preferably, the first discovery information is sent in a broadcast manner.

Preferably, in this embodiment, the first device may be the first device 101 in the wireless network system, shown in FIG. 1. The second device may be the second device 102 in the wireless network system shown in FIG. 1, and is a source device sending the first discovery information. The third device may be the third device 103 in the wireless network system shown in FIG. 1, and is a destination device of the first discovery information. The first device may be a relay device. Optionally, when sending information to the third device in a unicast manner, the second device may send the first discovery information that carries the ID of the second device and the ID of the third device. Alternatively, optionally, when sending information in a broadcast manner, or to make the second device discovered by another device, the second device may send the first discovery information that carries only the ID of the second device.

Optionally, the second device may repeatedly send the first discovery information.

202. The first device adds an ID of the first device to the first discovery information and sends the first discovery information to which the ID of the first device is added.

Optionally, when the first discovery information does not include the ID of the first device, the first device adds the ID of the first device to the first discovery information, and sends the first discovery information to which the ID of the first device is added. If the first discovery information includes the ID of the first device, it indicates that the first device has forwarded the first discovery information and does not need to forward the first discovery information again. Alternatively, for another discovery information, if an ID of a destination device carried in the discovery information is the ID of the first device, the first device does not need to forward the discovery information.

Using the wireless network system 10 shown in FIG. 1 as an example, when the second device 102 needs to transmit data with the third device 103 in a unicast manner, the second device 102 sends one or more pieces of discovery information in a broadcast manner. The discovery information carries the ID of the second device 102 and the ID of the third device 103. Alternatively, when the second device needs to send information in a broadcast manner, to make the second device discovered by another device, the second device may send one or more pieces of first discovery information that carries only the ID of the second device. The first device 101, the fourth device 104, and the fifth device 105 may directly receive the discovery information sent by the second device 102, or may receive the discovery information sent by the second device 102 and forwarded by another device. Herein, for example, the discovery information is sequentially received by the three devices. For example, after receiving the discovery information and determining that the discovery information does not include an ID of the fourth device 104, the fourth device 104 adds the ID of the fourth device 104 to the discovery information, and then broadcasts the discovery information. After receiving the discovery information broadcasted by the fourth device 104 and determining that the discovery information does not include the ID of the first device 101, the first device 101 adds the ID of the first device 101 to the discovery information, and broadcasts the discovery information. The fifth device 105 performs the same steps, until the third device 103 receives the broadcasted information. In this way, a transmission path may be determined according to the IDs of the devices included in the discovery information.

Optionally, the first discovery information includes duration information of the first discovery information. The duration information of the first discovery information is used to indicate validity duration of the first discovery information. When a time point at which the first device receives the first discovery information is within the validity duration of the first discovery information, the first device adds the ID of the first device to the first discovery information, and sends the first discovery information. The duration information of the first discovery information is used to avoid excessively long duration in which the discovery information is forwarded in the wireless network system, and avoid waste of resources and unnecessary network congestion.

Preferably, the first device may further add signal quality information of the first device to the first discovery information. The signal quality information of the first device is used to indicate signal quality that exists when the first device receives the first discovery information. Further, optionally, the signal quality information of the first device includes at least one of signal strength information that exists when the first device receives the first discovery information, signal-to-noise ratio information that exists when the first device receives the first discovery information, or MCS (Modulation and Coding Scheme, modulation and coding scheme) information when the first device receives the first discovery information. The MCS information may be an MCS level.

The ID of the first device, the ID of the second device, and the ID of the third device may all be assigned by a base station or configured by the devices. The ID of the first device includes at least one of a proximity service ProSe (Proximity Service, proximity service) ID of the first device or a C-RNTI (Cell Radio Network Temporary Identifier, cell radio network temporary identifier) of the first device. The ID of the second device includes at least one of a ProSe ID of the second device or a C-RNTI of the second device. The ID of the third device includes at least one of a ProSe ID of the third device or a C-RNTI of the third device. Certainly, the description is provided herein by way of example only, and does not indicate that the present invention is limited thereto.

Figure 3:
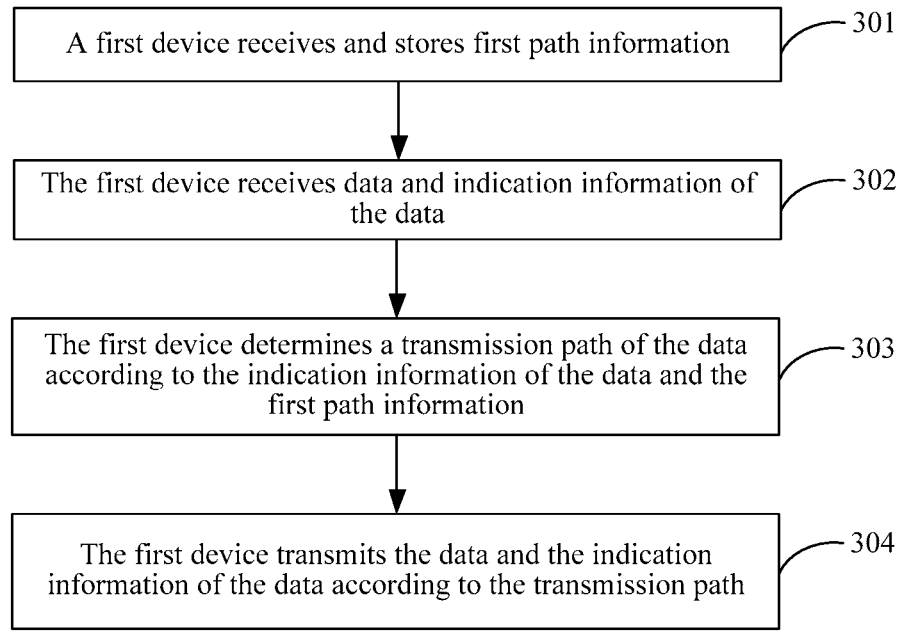
FIG. 3 is a schematic flowchart of an information transmission method according to an embodiment of the present invention.

Optionally, after the first device adds the ID of the first device to the first discovery information, an embodiment provides an information transmission method. The method is based on the path selection method shown in FIG. 2 and is performed after the path selection method shown in FIG. 1 is performed. Referring to FIG. 3, the method includes the following steps.

301. A first device receives and stores first path information.

The first path information is used to indicate a data transmission path between a second device and a third device. The first path information includes an ID of the first device and an ID of the second device. Alternatively, the first path information includes the ID of the first device, the ID of the second device, and an ID of the third device. Specifically, optionally, with reference to the description in step 101, when the second device needs to send information to the third device, the first path information may include the ID of the first device, the ID of the second device, and the ID of the third device. Alternatively, optionally, when the second device needs to send information in a broadcast manner, the first path information may include only the ID of the first device and the ID of the second device.

Optionally, the first path information is sent to the first device by a base station or is sent to the first device by a preceding-hop device that is of the first device and that is indicated by the first path information. Alternatively, the first device may send, according to the first path information, the first path information to a next-hop device that is of the first device and that is indicated by the first path information.

Using the wireless network system 10 shown in FIG. 1 as an example, when the second device 102 sends first discovery information according to a transmission sequence of the second device 102—the fourth device 104—the first device 101—the fifth device 105—the third device 103, after determining first path information, the third device 103 may send the first path information to the base station 106. The base station 106 sends the first path information to the second device 102, the fourth device 104, the first device 101, and the fifth device 105. Alternatively, after determining the first path information, the third device 103 may sequentially transmit the first path information according to a sequence opposite to the foregoing sequence of receiving the first discovery information. The third device 103 transmits the first path information to the fifth device 105. The fifth device 105 stores the first path information and forwards the first path information to the first device 101. The first device 101 stores the first path information and forwards the first path information to the fourth device 104. The fourth device 104 stores the first path information and forwards the first path information to the second, device 102.

Preferably, IDs of relay devices in the first path information are sequentially arranged according to a sequence in a transmission path that is from the second device to the third device, or are sequentially arranged according to a sequence in a transmission path from the third device to the second device. For example, using the wireless network system shown in FIG. 1 as an example, the first path information may sequentially include an ID of the second device 102, an ID of the fourth device 104, an. ID of the first device 101, an ID of the fifth device 105, and an ID of the third device 103. Optionally, a frequency domain may be used to distinguish a sequence of the IDs of the relay devices. Alternatively, a time domain may be used to distinguish the sequence of the IDs of the relay devices. Alternatively, a logical domain may be used to distinguish the sequence of the IDs of the relay devices. This is not specifically limited in the present invention.

Optionally, the first path information includes duration information of the first path information. The duration information of the first path information is used to indicate validity duration of the first path information. When duration in which the first device stores the first path information exceeds the validity duration indicated by the duration information, the first device may delete the first path information. Alternatively, when information transmission between a destination device and a source device is completed, a deletion instruction may be sent to the relay devices, to instruct to delete the first path information. The first device may delete the first path information according to the received deletion instruction.

302. The first device receives data and indication information of the data.

The indication information of the data includes an ID of the source device and an ID of the destination device. Alternatively, the indication information of the data includes only the ID of the source device. The source device is the third device and the destination device is the second device. Alternatively, the source device is the second device and the destination device is the third device. It should be noted herein that, if the data is transmitted in a broadcast manner, the indication information of the data may not include the ID of the destination device, but include only the ID of the source device.

303. The first device determines a transmission path of the data according to the indication information of the data and the first path information.

It should be noted herein that, if the data is transmitted in a unidirectional manner, the transmission path may be determined according to only the first path information. If the data is transmitted in a bidirectional manner, only a transmission path of the data can be determined according to the first path information, while a transmission direction cannot be determined. In this case, the transmission path of the data needs to be determined according to the indication information of the data and the first path information. However, multiple pieces of path information may be stored in the first device, and in this case, the first path information needs to be determined according to the indication information of the data.

Using the wireless network system shown in FIG. 1 as an example, when the second device 102 transmits data to the third device 103 by using the fourth device 104, the first device 101, and the fifth device 105, if the second device 102 transmits the data to the third device 103 in a broadcast manner, the first device 101 needs to search at least one piece of path information for the first path information according to the ID of the second device included in the indication information of the data, and transmit the data according to the first path information. If the second device 102 transmits data with the third device 103 in a bidirectional manner, the first device 101 needs to search at least one piece of path information for the first path information according to the ID of the second device or the ID of the third device included in the indication information of the data, and determine a transmission direction of the data according to an ID of a destination device and the first path information. If the destination device is the third device 103, the transmission path is the first device 101—the fifth device 105—the third device 103. If the destination device is the second device 102, the transmission path is the first device 101—the fourth device 104—the second device 102.

304. The first device transmits the data and the indication information of the data according to the transmission path of the data.

Optionally, the first device generates a first scrambling code sequence according to a first scrambling code seed. The first scrambling code seed is generated according to an ID of the next-hop device that is of the first device and that is on the transmission path of the data. The first device scrambles at least one of the data or the indication information of the data according to the first scrambling code sequence.

In addition, optionally, the indication information of the data may further include a path, information identifier. The path information identifier is used to indicate that the data includes path information. If the indication information of the data includes a path information identifier, it indicates that the data includes path information, so that the first device decodes the data and stores the path information included in the data. If the indication information of the data does not include a path information identifier, the first device does not need to decode the data, and directly forwards the data. Preferably, the path information identifier may be 1 bit in the indication information of the data.

In the path selection method provided in this embodiment of the present invention, a first device receives first discovery information sent by a second device, adds an ID of the first device to the first discovery information, and sends the first discovery information to which the ID of the first device is added, so that a destination device can determine a transmission path after receiving the first discovery information. In this way, a problem in the prior art that if a distance between two terminal devices performing direct communication is relatively long or channel quality changes relatively greatly, the two terminal devices cannot perform D2D communication is resolved.

Figure 4:
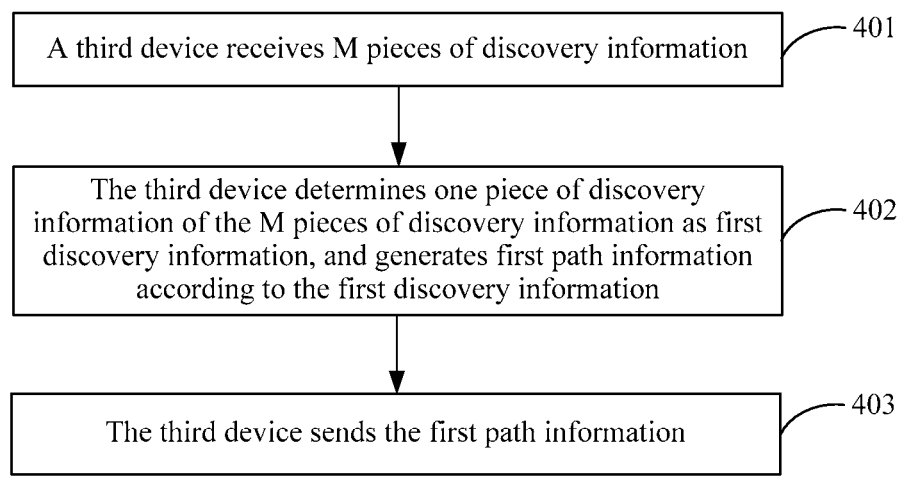
FIG. 4 is a schematic flowchart of another path selection method according to an embodiment of the present invention.

With reference to the embodiment that corresponds to FIG. 2, an embodiment of the present invention provides another path selection method, which corresponds to the destination device in the path selection method described in the embodiment that corresponds to FIG. 2, and is preferably applied to a D2D scenario. The path selection method provided in this embodiment of the present invention may be implemented based on the wireless network system shown in FIG. 1. Certainly, the description is provided herein by way of example only, and does not indicate that the present invention is limited thereto. Referring to FIG. 4, the method includes the following steps.

401. A third device receives M pieces of discovery information.

An $m^{th}$ discovery information of the M pieces of discovery information includes an ID of the third device, an ID of a second device, and IDs of $N_m$ relay devices. Alternatively, the $m^{th}$ discovery information of the M pieces of discovery information includes the ID of the second device and the IDs of the $N_m$ relay devices. The second device may be a source device of information transmission.

With reference to the description in step 201 of the embodiment that corresponds to FIG. 2, it should be noted that, when sending information to the third device in a unicast manner, the second device may send first discovery information that carries the ID of the second device and the ID of the third device. In this case, the discovery information received by the third device carries the ID of the second device, the ID of the third device, and an ID of at least one relay device. Alternatively, optionally, when sending information in a broadcast manner, the second device may send the first discovery information that carries only the ID of the second device. In this case, the discovery information received by the third device carries the ID of the second device and the ID of at least one relay device.

Using the wireless network system 10 in FIG. 1 as an example and with reference to the description in step 202 of the embodiment shown in FIG. 2, when the second device 102 needs to transmit data with the third device 103, the second device 102 sends one or more pieces of discovery information in a broadcast manner. The first device 101, the fourth device 104, and the fifth device 105 may directly receive the discovery information sent by the second device 102, or may receive discovery information forwarded by another device. For example, the discovery information is transmitted to the third device 103 after being forwarded by the fourth device 104 and the first device 101, and the discovery information is transmitted to the third device 103 after being forwarded by the fifth device 105. In this case, the third device 103 receives two pieces of discovery information that is from a same source and destination devices of both are the third device, and two paths are generated between the third device 103 and the second device 102, The two paths are respectively:

the second device 102—the fourth device 104—the first device 101—the third device 103; and the second device 102—the fifth device 105—the third device 103.

The third device 103 may select one path from the two paths to transmit data. Certainly, the description is provided herein by way of example only, and does not indicate that the present invention is limited thereto.

402. The third device determines one piece of discovery information of the M pieces of discovery information as first discovery information, and generates first path information according to the first discovery information.

The first path information includes an ID of a relay device, the ID of the third device, and the ID of the second device in the first discovery information. Alternatively, the first path information includes the IDs the relay devices and the ID of the second device in the first discovery information.

With reference to the description in step 401, when the second device sends information to the third device in a unicast manner, the first path information may include the IDs of the relay devices, the ID of the third device, and the ID of the second device in the first discovery information. When the second device sends information to the third device in a broadcast manner, the first path information may include only the IDs of the relay devices and the ID of the second device in the first discovery information.

Optionally, in an application scenario, the third device may use discovery information that is of the M pieces of discovery information and that includes a minimum quantity of relay devices as the first discovery information. Alternatively, the third device may use discovery information that is of the M pieces of discovery information and that indicates that a path between relay devices is the shortest.

Alternatively, optionally, in another application scenario, the $m^{th}$ discovery information of the M pieces of discovery information further includes signal quality information of each of the $N_m$ relay devices. Signal quality information of an $i^{th}$ relay device of the $N_m$ relay devices is used to indicate signal quality when the $i^{th}$ relay device receives the first discovery information. The third device may use discovery information that includes best signal quality of a relay device as the first discovery information.

Optionally, the signal quality information of the $i^{th}$ relay device includes at least one of signal strength information that exists when the $i^{th}$ relay device receives the first discovery information, signal-to-noise ratio information that exists when the $i^{th}$ relay device receives the first discovery information, or MCS information that exists when the $i^{th}$ relay device receives the first discovery information. Preferably, the MCS information may be an MCS level.

Optionally, the first path information includes duration information of the first path information. The duration information of the first path information is used to indicate validity duration of the first path information.

403. The third device sends the first path information.

Optionally, with reference to the description in step 301 of the embodiment that corresponds to FIG. 2, the first path information may be sent to a base station or a next-hop device that is of the third device and that is indicated by the first path information.

It should be noted that the ID of the first device, the ID of the second device, and the ID of the third device may all be assigned by the base station or configured by the devices. The ID of the first device includes at least one of a proximity service ProSe ID of the first device or a C-RNTI of the first device. The ID of the second device includes at least one of a ProSe ID of the second device or a C-RNTI of the second device. The ID of the third device includes at least one of a ProSe ID of the third device or a C-RNTI of the third device. Certainly, the description is provided herein by way of example only, and does not indicate that the present invention is limited thereto.

In the path selection method provided in this embodiment of the present invention, a third device receives M pieces of discovery information, determines one piece of discovery information of the M pieces of discovery information as first discovery information, generates first path information according to the first discovery information, and sends the first path information. Because the received discovery information includes an ID of each relay device, a transmission path may be determined by the third device. In this way, a problem in the prior art that if a distance between two terminal devices performing direct communication is relatively long or channel quality changes relatively greatly, the two terminal devices cannot perform D2D communication is resolved.

Figure 5:
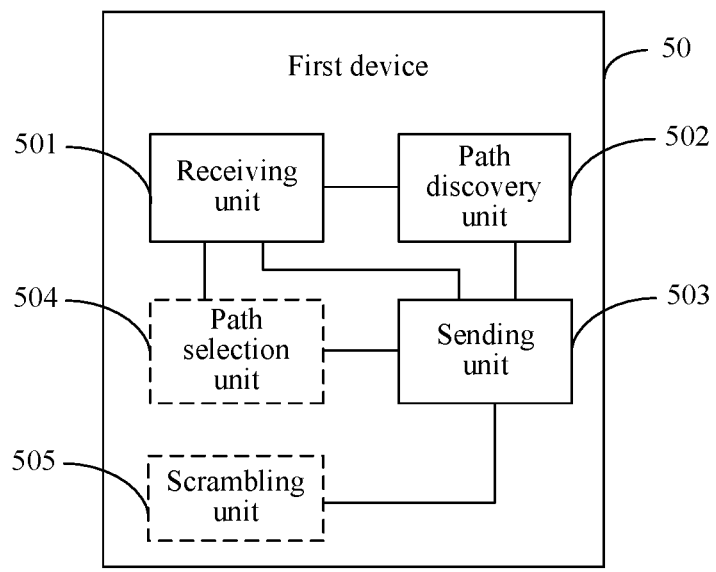
FIG. 5 is a schematic structural diagram of a first device according to an embodiment of the present invention.

Erased on the embodiment that corresponds to FIG. 2, an embodiment of the present invention provides a first device, configured to perform the path selection method described in the embodiment that corresponds to FIG. 2. Referring to FIG. 5, the first device 50 includes: a receiving unit 501, a path discovery unit 502, and a sending unit 503.

The receiving unit 501 is configured to receive first discovery information sent by a second device. The first discovery information includes an identifier ID of the second device. Alternatively, the first discovery information includes the ID of the second device and an ID of a third device.

The path discovery unit 502 is configured to add an ID of the first device to the first discovery information received by the receiving unit 501.

The sending unit 503 is configured to send the first discovery information to which the ID of the first device is added by the path discovery unit 502.

Optionally, the path discovery unit 502 is further configured to add signal quality information of the first device to the first discovery information. The signal quality information of the first device is used to indicate signal quality that exists when the first device receives the first discovery information.

Preferably, the signal quality information of the first device includes at least one of signal strength information that exists when the first device receives the first discovery information, signal-to-noise ratio information that exists when the first device receives the first discovery information, or modulation and coding scheme MCS information that exists when the first device receives the first discovery information, Optionally, the path discovery unit 502 is further configured to add the ID of the first device to the first discovery information when the first discovery information does not include the ID of the first device.

Optionally, the first discovery information includes duration information of the first discovery information. The duration information of the first discovery information is used to indicate validity duration of the first discovery information.

In this case, the path discovery unit 502 is further configured to add the ID of the first device to the first discovery information when a time point at which the first device receives the first discovery information is within the validity duration of the first discovery information.

Optionally, the ID of the first device is assigned by a base station or configured by the first device. The ID of the first device may include at least one of a proximity service ProSe ID of the first device or a cell radio network temporary identifier C-RNTI of the first device.

Optionally, the first device 50 provided in this embodiment may further be configured to perform the information transmission method described in the embodiment that corresponds to FIG. 3. The first device 50 may further include a path selection unit 504 and a scrambling unit 505.

Optionally, the receiving unit 501 is further configured to receive first path information. The first path information is used to indicate a data transmission path between the second device and the third device. The first path information includes the ID of the first device and the ID of the second device. Alternatively, the first path information includes the ID of the first device, the ID of the second device, and the ID of the third device.

The path selection unit 504 is configured to store the first path information received by the receiving unit 501.

Optionally, in a first application scenario, the first path information is sent to the first device by the base station or is sent to the first device by a preceding-hop device that is of the first device and that is indicated by the first path information.

The sending unit 503 is further configured to: when the first path information is sent to the first device by the preceding-hop device that is of the first device and that is indicated by the first path information, send, according to the first path information, the first path information to a next-hop device that is of the first device and that is indicated by the first path information.

Optionally, in a second application scenario, the first path information includes duration information of the first path information. The duration information of the first path information is used to indicate validity duration of the first path information.

The path selection unit 504 is further configured to delete the first path information when duration in which the first path information is stored exceeds the validity duration indicated by the duration information.

Optionally, in a third application scenario, the receiving unit 501 is further configured to receive a deletion instruction. The deletion instruction is used to instruct to delete the first path information.

The path selection unit 504 is further configured to delete the first path information according to the deletion instruction received by the receiving unit 501.

Optionally, the receiving unit 501 is further configured to receive data and indication information of the data. The indication information of the data includes an ID of a source device and an ID of a destination device. Alternatively, the indication information of the data includes only the ID of the source device. The source device is the third device and the destination device is the second device. Alternatively, the source device is the second device and the destination device is the third device.

The path selection unit 504 is further configured to determine a transmission path of the data according to the indication information of the data and the first path information received by the receiving unit 501.

The sending unit 503 is further configured to transmit the data and the indication information of the data according to the transmission path of the data that is determined by the path selection unit 504.

Further, optionally, the path selection unit 504 is further configured to add an ID of the next-hop device of the first device to the indication information of the data according to the transmission path of the data.

Alternatively, optionally, the scrambling unit 505 is configured to: generate a first scrambling code sequence according to a first scrambling code seed, and scramble at least one of the data or the indication information of the data according to the first scrambling code sequence. The first scrambling code seed is generated according to the ID of the next-hop device that is of the first device and that is in the transmission path of the data.

Optionally, the path selection unit 504 is further configured to: when the indication information of the data further includes a path information identifier, decode the data and store path information included in the data. The path information identifier is used to indicate that the data includes the path information, The first device provided in this embodiment of the present invention receives first discovery information sent by a second device, adds an ID of the first device to the first discovery information, and sends the first discovery information to which the ID of the first device is added, so that a destination device can determine a transmission path after receiving the first discovery information. In this way, a problem in the prior art that if a distance between two terminal devices performing direct communication is relatively long or channel quality changes relatively greatly, the two terminal devices cannot perform D2D communication is resolved.

Figure 6:
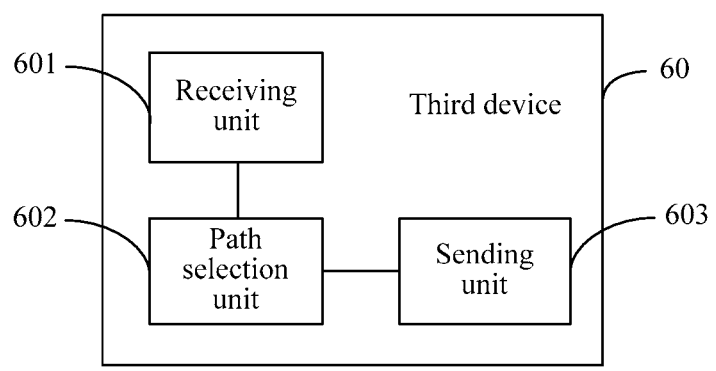
FIG. 6 is a schematic structural diagram of a third device according to an embodiment of the present invention.

Erased on the embodiment that corresponds to FIG. 4, an embodiment of the present invention provides a third device, configured to perform the path selection method described in the embodiment that corresponds to FIG. 4. Referring to FIG. 6, the third device 60 includes: a receiving unit 601, a path selection unit 602, and a sending unit 603.

The receiver 601 is configured to receive M pieces of discovery information. An $m^{th}$ discovery information of the M pieces of discovery information includes an ID of the third device, an ID of a second device, and IDs of $N_m$ relay devices. Alternatively, the $m^{th}$ discovery information of the M pieces of discovery information includes the ID of the second device and the IDs of the $N_m$ relay devices. M and $N_m$ are positive integers, and m is an integer within [1, M].

The path selection unit 602 is configured to: determine one piece of discovery information of the M pieces of discovery information received by the receiving unit 601 as the first discovery information, and generate first path information according to the first discovery information. The first path information includes an ID of a relay device, the ID of the third device, and the ID of the second device in the first discovery information. Alternatively, the first path information includes the IDs of the relay devices and the ID of the second device in the first discovery information.

The sending unit 603 is configured to send the first path information generated by the path selection unit 602.

Optionally, in an application scenario, the path selection unit 602 is further configured to use discovery information that is of the M pieces of discovery information and that includes a minimum quantity of relay devices as the first discovery information.

Alternatively, optionally, in another application scenario, the $m^{th}$ discovery information of the M pieces of discovery information further includes signal quality information of each of the $N_m$ relay devices. Signal quality information of an $i^{th}$ relay device of the $N_m$ relay devices is used to indicate signal quality when the $i^{th}$ relay device receives the first discovery information, where i is an integer within $[1, N_m]$.

The path selection unit 602 is further configured to use discovery information that includes best signal quality of a relay device as the first discovery information.

Preferably, the signal quality information of the $i^{th}$ relay device includes at least one of signal strength information that exists when the $i^{th}$ relay device receives the first discovery information, signal-to-noise ratio information that exists when the $i^{th}$ relay device receives the first discovery information, or modulation and coding scheme MCS information that exists when the $i^{th}$ relay device receives the first discovery information.

Optionally, the sending unit 603 is further configured to send the first path information to a base station, or to a next-hop device that is of the third device and that is indicated by the first path information.

Optionally, the first path information includes duration information of the first path information. The duration information of the first path information is used to indicate validity duration of the first path information.

Optionally, the ID of the third device is assigned by the base station or configured by the third device.

The ID of the third device may include at least one of a proximity service ProSe ID of the third device or a cell radio network temporary identifier C-RNTI of the third device.

The third device provided in this embodiment of the present invention receives M pieces of discovery information, determines one piece of discovery information of the M pieces of discovery information as first discovery information, generates first path information according to the first discovery information, and sends the first path information. Because the received discovery information includes an ID of each relay device, a transmission path may be determined by the third device. In this way, a problem, in the prior art that if a distance between two terminal devices performing direct communication is relatively long or channel quality changes relatively greatly, the two terminal devices cannot perform. D2D communication is resolved.

Figure 7:
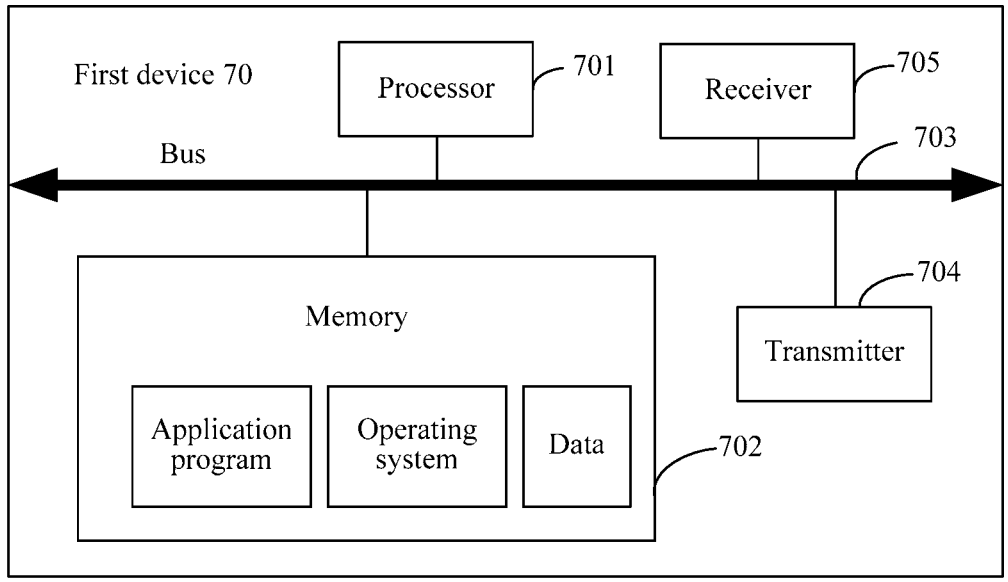
FIG. 7 is a schematic structural diagram of a first device according to another embodiment of the present invention.

Based on the embodiment that corresponds to FIG. 2, another embodiment of the present invention provides a. first device, configured to perform the path selection method described in the embodiment that corresponds to FIG. 2. Referring to FIG. 7, the first device 70 includes: at least one processor 701, a memory 702, a bus 703, a transmitter 704, and a receiver 705. The at least one processor 701, the memory 702, the transmitter 704, and the receiver 705 are connected and communicate with each other by using the bus 703.

The bus 703 may be an ISA (Industry Standard Architecture, industry standard architecture) bus, a PCI (Peripheral Component, peripheral component interconnect) bus, an EISA. (Extended Industry Standard Architecture, extended industry standard architecture) bus, or the like. The bus 703 may be classified into an address bus, a data bus, a control bus, and the like. For convenience of illustration, only one bold line is used for illustration in FIG. 7, but it does not indicate that there is only one bus or one type of bus.

The memory 702 is configured to execute application program, code in the solution of the present invention. The application program code for executing the solution of the present invention is stored in the memory, and is controlled and executed by the processor 701.

The memory may be a read-only memory ROM or a static storage device of another type that can store static information and an instruction; a random access memory RAM or a dynamic storage device of another type that can store static information and an instruction; or an electrically erasable programmable read-only memory EEPROM, a compact disc read-only memory CD-ROM or other optical disk storages, an optical disc (including a compressed disc, a laser disk, an optical disc, a digital versatile disc, a Blu-ray disc, or the like) storage, a disk storage medium or other disk storages, or any other medium that can be used to carry or store expected program code in a command or data structure form and can be accessed by a computer, but is not limited thereto. These memories are connected to the processor by using the bus.

The processor 701 may be a central processing unit 701 (Central Processing Unit, CPU for short), an application-specific integrated circuit (Application Specific Integrated Circuit, ASIC for short), or one or more integrated circuits configured to implement this embodiment of the present invention.

The receiver 705 is configured to receive first discovery information sent by a second device. The first discovery information includes an identifier ID of the second device. Alternatively, the first discovery information includes the ID of the second device and an ID of a third device.

The processor 701 is configured to add an ID of the first device to the first discovery information received by the receiver 705.

The transmitter 704 is configured to send first discovery information to which the ID of the first device is added by the processor 701.

Optionally, the processor 701 is further configured to add signal quality information of the first device to the first discovery information. The signal quality information of the first device is used to indicate signal quality that exists when the first device receives the first discovery information.

Preferably, the signal quality information of the first device includes at least one of signal strength information that exists when the first device receives the first discovery information, signal-to-noise ratio information that exists when the first device receives the first discovery information, or modulation and coding scheme MCS information that exists when the first device receives the first discovery information.

Optionally, the processor 701 is further configured to add the ID of the first device to the first discovery information when the first discovery information does not include the ID of the first device.

Optionally, the first discovery information includes duration information of the first discovery information. The duration information of the first discovery information is used to indicate validity duration of the first discovery information.

In this case, the processor 701 is further configured to add the ID of the first device to the first discovery information when a time point at which the first device receives the first discovery information is within the validity duration of the first discovery information.

Optionally, the ID of the first device is assigned by a base station or configured by the first device. The ID of the first device may include at least one of a proximity service ProSe ID of the first device or a cell radio network temporary identifier C-RNTI of the first device.

Optionally, the first device 70 provided in this embodiment may further be configured to perform the information transmission method described in the embodiment that corresponds to FIG. 3.

Optionally, the receiver 705 is further configured to receive and store first path information. The first path information is used to indicate a data transmission path between the second device and the third device. The first path information includes the ID of the first device and the ID of the second device. Alternatively, the first path information includes the ID of the first device, the ID of the second device, and the ID of the third device.

The processor 701 is further configured to store the first path information received by the receiver 705.

Optionally, in a first application scenario, the first path information is sent to the first device by the base station or is sent to the first device by a preceding-hop device that is of the first device and that is indicated by the first path information.

The transmitter 704 is further configured to: when the first path information is sent to the first device by the preceding-hop device that is of the first device and that is indicated by the first path information, send, according to the first path information, the first path information to a next-hop device that is of the first device and that is indicated by the first path information.

Optionally, in a second application scenario, the first path information includes duration information of the first path information. The duration information of the first path information is used to indicate validity duration of the first path information.

The processor 701 is further configured to delete the first path information when duration in which the first path information is stored exceeds the validity duration indicated by the duration information.

Optionally, in a third application scenario, the receiver 705 is further configured to receive a deletion instruction. The deletion instruction is used to instruct to delete the first path information.

The processor 701 is further configured to delete the first path information according to the first path information received by the receiver 705.

Optionally, the receiver 705 is further configured to receive data and indication information of the data. The indication information of the data includes an ID of a source device and an ID of a destination device. Alternatively, the indication information of the data includes only the ID of the source device. The source device is the third device and the destination device is the second device. Alternatively, the source device is the second device and the destination device is the third device.

The processor 701 is further configured to determine a transmission path of the data according to the indication information of the data and the first path information received by the receiver 705.

The transmitter 704 is further configured to transmit the data and the indication information of the data according to the transmission path of the data that is determined by the processor 701.

Further, optionally, the processor 701 is further configured to add an ID of the next-hop device of the first device to the indication information of the data according to the transmission path of the data.

Alternatively, optionally, the processor 701 is further configured to: generate a first scrambling code sequence according to a first scrambling code seed, and scramble at least one of the data or the indication information of the data according to the first scrambling code sequence. The first scrambling code seed is generated according to the ID of the next-hop device that is of the first device and that is in the transmission path of the data.

Optionally, the processor 701 is further configured to: when the indication information of the data further includes a path information identifier, decode the data and store path information included in the data. The path information identifier is used to indicate that the data includes the path information.

The first device provided in this embodiment of the present invention receives first discovery information sent by a second device, adds an ID of the first device to the first discovery information, and sends the first discovery information to which the ID of the first device is added, so that a destination device can determine a transmission path after receiving the first discovery information. In this way, a problem in the prior art that if a distance between two terminal devices performing direct communication is relatively long or channel quality changes relatively greatly, the two terminal devices cannot perform D2D communication is resolved.

Figure 8:
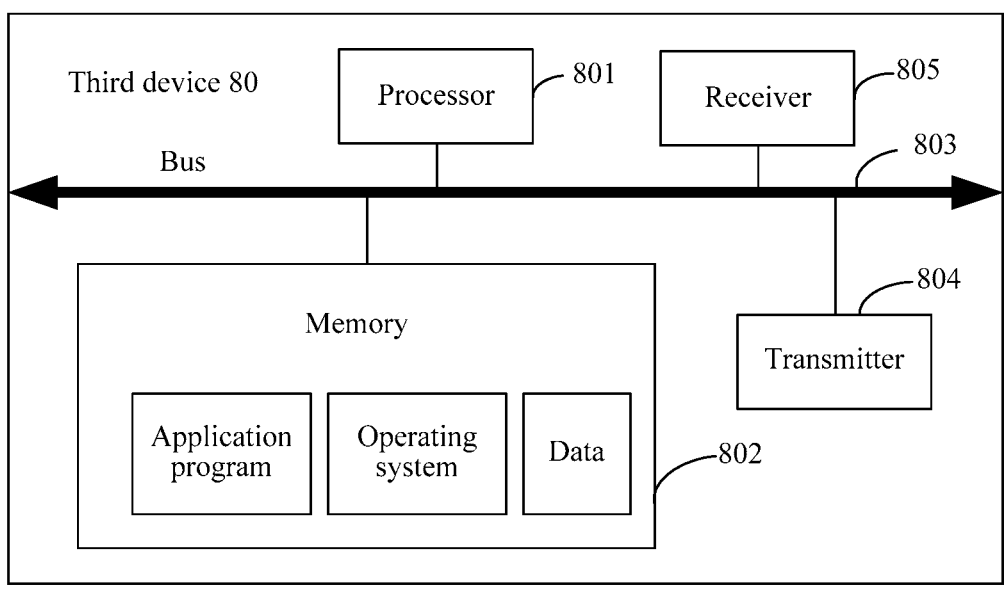
FIG. 8 is a schematic structural diagram of a third device according to another embodiment of the present invention.

Based on the embodiment that corresponds to FIG. 4, another embodiment of the present invention provides a third device, configured to perform the path selection method described in the embodiment that corresponds to FIG. 4. Referring to FIG. 8, the third device 80 includes: at least one processor 801, a memory 802, a bus 803, a transmitter 804, and a receiver 805. The at least one processor 801, the memory 802, the transmitter 804, and the receiver 805 are connected and communicate with each other by using the bus 803.

The bus 803 may be an ISA (Industry Standard Architecture, industry standard architecture) bus, a PCI (Peripheral Component, peripheral component interconnect) bus, an EISA (Extended Industry Standard Architecture, extended industry standard architecture) bus, or the like. The bus 803 may be classified into an address bus, a data bus, a control bus, and the like. For convenience of illustration, only one bold line is used for illustration in FIG. 8, but it does not indicate that there is only one bus or one type of bus.

The memory 802 is configured to execute application program code in the solution of the present invention. The application program code for executing the solution of the present invention is stored in the memory, and is controlled and executed by the processor 801.

The memory may be a read-only memory ROM or a static storage device of another type that can store static information and an instruction; a random access memory RAM or a dynamic storage device of another type that can store static information and an instruction; or an electrically erasable programmable read-only memory EEPROM, a compact disc read-only memory CD-ROM or other optical disk storages, an optical disc (including a compressed disc, a laser disk, an optical disc, a digital versatile disc, a Blu-ray disc, or the like) storage, a disk storage medium or other disk storages, or any other medium that can be used to carry or store expected program, code in a command or data structure form and can be accessed by a computer, but is not limited thereto. These memories are connected to the processor by using the bus.

The processor 801 may be a central processing unit 801 (Central Processing Unit, CPU for short), an application-specific integrated circuit (Application Specific Integrated Circuit, ASIC for short), or one or more integrated circuits configured to implement this embodiment of the present invention.

The receiver 805 is configured to receive M pieces of discovery information. An $m^{th}$ discovery information of the M pieces of discovery information includes an ID of the third device, an ID of a second device, and IDs of $N_m$ relay devices. Alternatively, the $m^{th}$ discovery information of the M pieces of discovery information includes the ID of the second device and the IDs of the $N_m$ relay devices. M and $N_m$ are positive integers, and m is an integer within [1, M].

The processor 801 is configured to: determine one piece of discovery information of the M pieces of discovery information received by the receiver 805 as first discovery information, and generate first path information according to the first discovery information. The first path information includes an ID of a relay device, the ID of the third device, and the ID of the second device in the first discovery information. Alternatively, the first path information includes the IDs of the relay devices and the ID of the second device in the first discovery information.

The transmitter 804 is configured to send the first path information generate by the processor 801.

Optionally, in an application scenario, the processor 801 is further configured to use discovery information that is of the M pieces of discovery information and that includes a minimum quantity of relay devices as the first discovery information.

Alternatively, optionally, in another application scenario, the $m^{th}$ discovery information of the M pieces of discovery information further includes signal quality information of each of the $N_m$ relay devices. Signal quality information of an $i^{th}$ relay device of the $N_m$ relay devices is used to indicate signal quality when the $i^{th}$ relay device receives the first discovery information, where i is an integer within [1, $N_m$].

The processor 801 is further configured to use discovery information that includes best signal quality of a relay device as the first discovery information.

Preferably, the signal quality information of the $i^{th}$ relay device includes at least one of signal strength information that exists when the $i^{th}$ relay device receives the first discovery information, signal-to-noise ratio information that exists when the $i^{th}$ relay device receives the first discovery information, or modulation and coding scheme MCS information that exists when the $i^{th}$ relay device receives the first discovery information.

Optionally, the transmitter 804 is further configured to send the first path information to a base station, or to a next-hop device that is of the third device and that is indicated by the first path information.

Optionally, the first path information includes duration information of the first path information. The duration information of the first path information is used to indicate validity duration of the first path information.

Optionally, the ID of the third device is assigned by the base station or configured by the third device.

The ID of the third device may include at least one of a proximity service ProSe ID of the third device or a cell radio network temporary identifier C-RNTI of the third device.

The third device provided in this embodiment of the present invention receives M pieces of discovery information, determines one piece of discovery information of the M pieces of discovery information as first discovery information, generates first path information according to the first discovery information, and sends the first path information. Because the received discovery information includes an ID of each relay device, a transmission path may be determined by the third device. In this way, a problem in the prior art that if a distance between two terminal devices performing direct communication is relatively long or channel quality changes relatively greatly, the two terminal devices cannot perform D2D communication is resolved.

Figure 9:
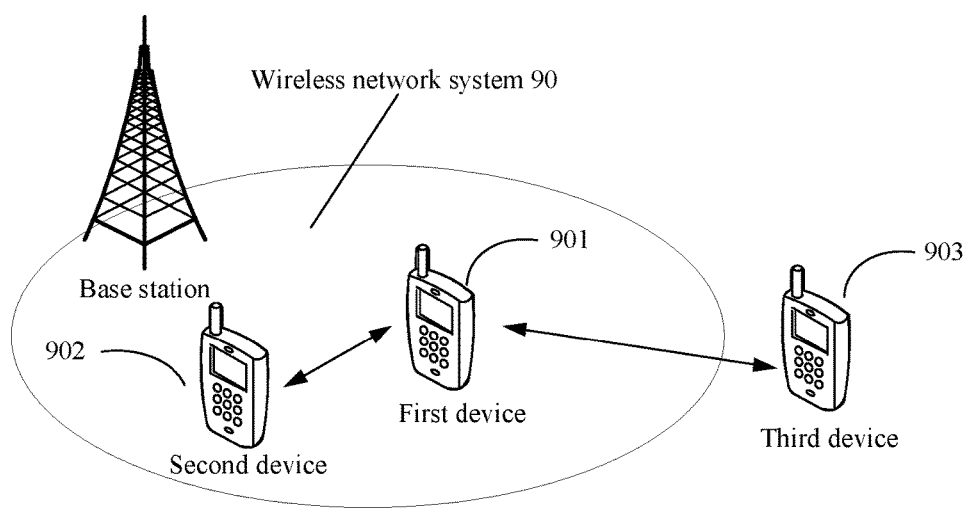
FIG. 9 is a schematic structural diagram of a wireless network system according to another embodiment of the present invention.

Based on the embodiment, that, corresponds to FIG. 2, the embodiment that corresponds to FIG. 3, and the embodiment that corresponds to FIG. 4, another embodiment of the present invention provides a wireless network system, configured to perform the path selection method described in the embodiment that corresponds to FIG. 2 and the path selection method described in the embodiment that corresponds to FIG. 4, or perform, the information the transmission method described in the embodiment that corresponds to FIG. 3. Referring to FIG. 9, the wireless network system 90 includes: a first device 901, a second device 902, and a third device 903. Preferably, the first device 901 maybe the first device 101 in the wireless network system shown in FIG. 1. The second device 902 may be the second device 102 in the wireless network system, shown in FIG. 1. The third device 903 may be the third device 103 in the wireless network system shown in FIG. 1. Certainly, the description is provided herein by way of example only, and does not indicate that the present invention is limited thereto.

Specifically, the first device 901 is the first device described in the embodiment that corresponds to FIG. 5, and the third device 903 is the third device described in the embodiment that corresponds to FIG. 6.

Alternatively, the first device 901 is the first device described in the embodiment that corresponds to FIG. 7, and the third device 903 is the third device described in the embodiment that corresponds to FIG. 8.

In the wireless network system provided in this embodiment of the present invention, a first device receives first discovery information sent by a second device, adds an ID of the first device to the first discovery information, and sends the first discovery information to which the ID of the first device is added, so that a destination device can determine a transmission path after receiving the first discovery information. In this way, a problem in the prior art that if a distance between two terminal devices performing direct communication is relatively long or channel quality changes relatively greatly, the two terminal devices cannot perform D2D communication is resolved.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections maybe implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The software product is stored in a storage medium, and includes several instructions for instructing a computer device (which may be a personal computer, a server, a network device, and the like) to perform all or some of the steps of the methods described in the embodiments of the present invention. The storage medium may be any available medium accessible to a computer. The following is taken as an example but is not limited: The computer readable medium may include a RAM (Random Access Memory, random access memory), a ROM (Read-Only Memory, read-only memory), an EEPROM (Electrically Erasable Programmable Read-Only Memory, electrically erasable programmable read-only memory), a CD-ROM (Compact Disc Read Only Memory, compact disc read-only memory) or other optical disk storage, a disk storage medium or other disk storage, or any other medium that can be used to carry or store expected program code having an instruction or data structural form and can be accessed by a computer. In addition, any connection may be appropriately defined as a computer-readable medium. For example, if software is transmitted from a website, a server or another remote source by using a coaxial cable, an optical fiber/cable, a twisted pair, a DSL (Digital Subscriber Line, digital subscriber line) or wireless technologies such as infrared ray, radio and microwave, the coaxial cable, optical fiber/cable, twisted pair, DSL or wireless technologies such as infrared ray, radio and microwave are included in fixation of a medium to which they belong. For example, a disk and a disc used by the present invention includes a CD (Compact Disc, compact disc), a laser disc, an optical disc, a DVD disc (Digital Versatile Disc, digital versatile disc), a floppy disk and a Blu-ray disc, where the disk generally copies data by a magnetic means, and the disc copies data optically by a laser means. The foregoing combination should also be included in the protection scope of the computer-readable medium.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A path selection method, comprising:
   receiving, by a third device, M pieces of discovery information, wherein an $m^{th}$ discovery information of the M pieces of discovery information comprises an identifier (ID) of the third device, an ID of a second device, and IDs of $N_m$ relay devices, or the $m^{th}$ discovery information of the M pieces of discovery information comprises the ID of the second device and the IDs of the $N_m$ relay devices, wherein M and $N_m$ are positive integers, and m is an integer within [1, M];
   determining, by the third device, one piece of discovery information of the M pieces of discovery information as first discovery information, and generating first path information according to the first discovery information, wherein the first path information comprises an ID of a relay device, the ID of the third device, and the ID of the second device in the first discovery information, or the first path information comprises the IDs of the relay devices and the ID of the second device in the first discovery information; and
   sending, by the third device, the first path information.

2. The method according to claim 1, wherein determining, by the third device, one piece of discovery information of the M pieces of discovery information as first discovery information comprises:
   using, by the third device, discovery information of the M pieces of discovery information and that comprises a minimum quantity of relay devices as the first discovery information.

3. The method according to claim 1, wherein:
   the $m^{th}$ discovery information of the M pieces of discovery information further comprises signal quality information of each of the $N_m$ relay devices, the signal quality information of an $i^{th}$ relay device of the $N_m$ relay devices for indicating signal quality when the $i^{th}$ relay device receives the first discovery information, and i is an integer within [1, $N_m$]; and
   determining, by the third device, one piece of discovery information of the M pieces of discovery information as first discovery information comprises:
   using, by the third device, discovery information that comprises best signal quality of a relay device as the first discovery information.

4. The method according to claim 3, wherein:
   the signal quality information of the $i^{th}$ relay device comprises at least one of signal strength information that exists when the $i^{th}$ relay device receives the first discovery information, signal-to-noise ratio information that exists when the $i^{th}$ relay device receives the first discovery information, or modulation and coding scheme (MCS) information that exists when the $i^{th}$ relay device receives the first discovery information.

5. The method according to claim 1, wherein sending, by the third device, the first path information comprises:
   sending, by the third device, the first path information to a base station or a next-hop device of the third device and indicated by the first path information.

6. The method according to claim 1, wherein:
   the first path information comprises duration information of the first path information, the duration information of the first path information for indicating validity duration of the first path information.

7. The method according to claim 1, wherein:
   the ID of the third device is assigned by the base station or configured by the third device; and the ID of the third device comprises at least one of a proximity service ProSe ID of the third device or a cell radio network temporary identifier (C-RNTI) of the third device.

8. A device configured to perform path selection, the device comprising:
a processor; and
memory coupled to the processor, the memory comprising instructions that, when executed by the processor, cause the device to:
receive M pieces of discovery information, wherein an $M^{th}$ discovery information of the M pieces of discovery information comprises an identifier (ID) of the device, an ID of a second device, and IDs of $N_m$ relay devices, or the $M^{th}$ discovery information of the M pieces of discovery information comprises the ID of the second device and the IDs of the $N_m$ relay devices, wherein M and $N_m$ are positive integers, and m is an integer within [1, M],
determine one piece of discovery information of the M pieces of discovery information as first discovery information, and generate first path information according to the first discovery information, wherein the first path information comprises an ID of a relay device, the ID of the device, and the ID of the second device in the first discovery information, or the first path information comprises the IDs of the relay devices and the ID of the second device in the first discovery information, and
send the first path information.

9. The device according to claim 8, wherein to determine one piece of discovery information of the M pieces of discovery information as first discovery information, the instructions, when executed by the processor, cause the device to:
use discovery information of the M pieces of discovery information and that comprises a minimum quantity of relay devices as the first discovery information.

10. The device according to claim 8, wherein:
the $m^{th}$ discovery information of the M pieces of discovery information further comprises signal quality information of each of the $N_m$ relay devices, the signal quality information of an $i^{th}$ relay device of the $N_m$ relay devices for indicating signal quality when the $i^{th}$ relay device receives the first discovery information, and i is an integer within [1, $N_m$]; and
to determine one piece of discovery information of the M pieces of discovery information as first discovery information, the instructions, when executed by the processor, cause the device to:
use discovery information that comprises best signal quality of a relay device as the first discovery information.

11. The device according to claim 10, wherein:
the signal quality information of the $i^{th}$ relay device comprises at least one of signal strength information that exists when the $i^{th}$ relay device receives the first discovery information, signal-to-noise ratio information that exists when the $i^{th}$ relay device receives the first discovery information, or modulation and coding scheme (MCS) information that exists when the $i^{th}$ relay device receives the first discovery information.

12. The device according to claim 8, wherein to send the first path information, the instructions, when executed by the processor, cause the device to:
send the first path information to a base station or a next-hop device of the third device and indicated by the first path information.

13. The device according to claim 8, wherein:
the first path information comprises duration information of the first path information, the duration information of the first path information for indicating validity duration of the first path information.

14. The device according to claim 8, wherein:
the ID of the device is assigned by the base station or configured by the device; and
the ID of the device comprises at least one of a proximity service ProSe ID of the device or a cell radio network temporary identifier (C-RNTI) of the device.

* * * * *